United States Patent [19]

Autenrieth

[11] Patent Number: 6,096,286
[45] Date of Patent: Aug. 1, 2000

[54] SYSTEM FOR STEAM REFORMATION OF A HYDROCARBON AND OPERATING METHOD THEREFOR

[75] Inventor: Rainer Autenrieth, Erbach, Germany

[73] Assignee: DBB Fuel Cell Engines GmbH, Kirchheim, Germany

[21] Appl. No.: 09/175,479

[22] Filed: Oct. 20, 1998

[30] Foreign Application Priority Data

Oct. 20, 1997 [DE] Germany ............................ 197 46 251

[51] Int. Cl.[7] ................................ C01B 3/26; C01B 3/12; C01B 3/02; B01J 8/00; B01J 8/02; B01J 8/04; C07C 1/02

[52] U.S. Cl. .......................... 423/651; 252/373; 422/190; 422/197; 422/198; 422/211; 422/221; 423/245.3; 423/418.2; 423/648.1; 423/655

[58] Field of Search ...................................... 423/650, 651, 423/655, 418.2, 648.1, 245.3; 252/373; 422/188, 189, 190, 196, 197, 198, 211, 221

[56] References Cited

U.S. PATENT DOCUMENTS

| | | | |
|---|---|---|---|
| 5,232,682 | 8/1993 | DuPont | 423/648.1 |
| 5,516,344 | 5/1996 | Corrigan | 48/127.9 |
| 5,904,913 | 5/1999 | Bohm et al. | 423/648.1 |

FOREIGN PATENT DOCUMENTS

| | | |
|---|---|---|
| 0 361 648 A1 | 4/1990 | European Pat. Off. . |
| 0 600 621 A1 | 6/1994 | European Pat. Off. . |
| 2160-601 | 6/1990 | Japan . |
| WO 96/32188 | 10/1996 | WIPO . |

OTHER PUBLICATIONS

Patent Abstracts of Japan, E–1580, Jul. 19, 1994, vol. 18, No. 382, JP 6–111838 (A), Tomiaki Furuya, Apr. 22, 1994.

Patent Abstracts of Japan, C–1099, Aug. 19, 1993, vol. 17, No. 452, JP 5–105405 (A), Minoru Koga, Apr. 27, 1993.

Patent Abstracts of Japan, C–1099, Aug. 19, 1993, vol. 17, No. 452, JP 5–105403 (A), Minoru Koga, Apr. 27, 1993.

Patent Abstracts of Japan, C–1042, Mar. 30, 1993, vol. 17, No. 162, JP 4–325401 (A), Kozo Osaki, Nov. 13, 1992.

Patent Abstracts of Japan, C–854, Jul. 29, 1991, vol. 15, No. 297, JP 3–109202 (A), Yasushi Fujita, May 9, 1991.

Patent Abstract, JP 63–25201 (A), Tetsuro Okano, Feb. 2, 1988.

Patent Abstracts of Japan, JP 62138306 (A), Yonezawa Shigeki et al., Jun. 22, 1987.

Patent Abstracts of Japan, JP 63021203 (A), Mizuno Yutaka et al., Jan. 28, 1988.

Patent Abstracts of Japan, JP 63040701 (A), Mizuno Yutaka et al., Feb. 22, 1988.

Patent Abstracts of Japan, 07126001 (A), Tanizaki Katsuji et al., May 16, 1995.

*Primary Examiner*—Steven P. Griffin
*Assistant Examiner*—Maribel Medina
*Attorney, Agent, or Firm*—Evenson, Mc Keown, Edwards, Lenahan, P.L.L.C.

[57] ABSTRACT

A system for steam reformation of a hydrocarbon includes a combined oxidizer/burner unit connected downstream of a reformer and in thermal contact therewith. The combined unit functions during reformation reaction operation of the reformer as a CO oxidizer and simultaneously as a catalytic burner. During reformation reaction operation, a gas containing oxygen is added to the combined oxidizer/burner unit that has an oxygen component that is greater than the oxygen component required for CO oxidation alone. The system may be used, for example, in fuel-cell-operated motor vehicles to obtain hydrogen from methanol carried in liquid form that is required for the fuel cells.

10 Claims, 2 Drawing Sheets

SYSTEM FOR STEAM REFORMATION OF A HYDROCARBON AND OPERATING METHOD THEREFOR

BACKGROUND AND SUMMARY OF THE INVENTION

This application claims the priority of German Patent Application No. 197 46 251.0, filed Oct. 20, 1997, the disclosure of which is expressly incorporated by reference herein.

The present invention relates to a system for steam reformation of a hydrocarbon with a reformer as well as an operating method therefor. Systems of this kind and operating methods therefor are used for example in mobile applications in fuel-cell operated motor vehicles for hydrogen reformation of methanol. Methanol is transported in liquid form in order to provide the hydrogen required for the fuel cells, thus a large-volume water reservoir can be eliminated. A compact design of the system having a relatively low weight and low cost and permitting rapid reaction to the typical frequent load fluctuations in vehicles is desirable. A high degree of efficiency and the ability to heat the system rapidly are also desirable. Since the hydrogen reformation reaction takes place endothermally in a suitable reaction chamber of the reformer, which contains a suitable catalyst material, the reformer must be kept at a suitable elevated temperature during operation.

Systems of this kind are already known in which certain system components are integrated into a common module to produce a compact design. Reformation systems are disclosed in JP 62138306 A, JP 63021203 A, and JP 63040701 A, in which a reformer and an evaporator connected upstream thereof are integrated into a common reactor module. A burner is also associated with the reactor module, in which a fuel is burned with a flame to heat the evaporator directly. Provision can also be made to heat the reformer using the hot combustion offgases from the burner.

In a reformation system disclosed in U.S. Pat. No. 5,516,344, a reformer is integrated together with a CO shift converter connected downstream thereof into a common module. A burner is associated with this module that burns a supplied mixture with a flame. Then the reformer and the CO shift converter among other things are heated by the hot combustion offgases.

In a combined reformation and shift reactor disclosed in EP 0 600 621 A1, the heat generated by a CO shift stage is utilized in a steam generator that is in thermal contact with the CO shift stage.

JP 4-325401 (A) discloses a reformation reactor system with two reformers connected in series. The upstream reformer is in thermal contact with a CO conversion stage that is supplied with the starting product stream from the reformer located downstream, so that the steam reformation reaction that takes place in the upstream reformer is heated by the heat generated in the CO conversion stage.

In WO 96/32188, an exothermal chemical reaction in a first reaction chamber and an endothermal chemical reaction in a second reaction chamber that is in thermal contact with the first reaction chamber by means of a heat-conducting partition is disclosed. The two reaction chambers are connected in series in terms of flow. To perform methane or methanol reformation reactions, it is particularly proposed to react the methane or methanol in the upstream reaction chamber exothermally by an oxidation reaction, and in the downstream reaction chamber endothermally by means of a steam reformation reaction.

EP 0 361 648 A1 discloses a hydrogen-generating reactor of the tube bundle type for example, which includes a reformer unit with two reformer stages connected in series and a CO shift unit connected downstream. In the transitional area between the first and second reformation stages, the starting product gas from the first reformer stage is partially burned, especially the remaining methane still contained therein, with the addition of a gas containing oxygen, such as air. The CO content rises sharply, but is then reduced once again in the following CO shift unit, with the CO shift unit preferably being divided into two zones of different temperatures in series.

JP 07126001 A discloses a system that includes a reactor module of the plate stack type. This reactor module contains an evaporator, a reformer, and a CO oxidizer. These integrated three system components are connected in series in a direction transverse to the stack as a first group of second plate layers. A burner is provided adjacent to the evaporator in which an added mixture is burned with a flame. The hot combustion offgases are conducted in parallel with the reformation gas stream through a second group of second plate layers of the plate stack that forms a heat transfer structure. The second group of second plate layers alternate with those of the first group. As a result, the combustion offgases heat the evaporator, reformer, and CO oxidizer.

The object of the present invention is to provide a system for steam reformation of a hydrocarbon that is built in very compact form and at relatively low cost, and has a high degree of efficiency as well as high dynamics, together with a method for operating such a system.

The system according to an embodiment of the present invention includes an oxidizer/burner unit connected downstream from the reformer and in thermal contact therewith. The oxidizer/burner unit functions as both a CO oxidizer and simultaneously as a catalytic burner during reformation reaction operation of the reformer. In this manner, the functions of removal of carbon monoxide from the reformate gas and the heating of the reformer are achieved by this single combined oxidizer/burner unit. This allows the system to have an extremely compact design. As a result of the catalytic burner function, the reformer can be kept at the temperature required for reformation reaction operation by means of flameless combustion. As a result of the CO oxidation function, the CO concentration in the reformate gas can be reduced to a desired value, which is important for example during use of the reformate gas stream, which consists essentially of hydrogen, to supply the anode side of a fuel cell system in a motor vehicle operated by fuel cells, since excessively high CO concentrations can damage the catalyst material in the fuel cell system.

Because the system can be very compact, its space requirements are correspondingly low. The small volume of the reactor module composed of the reformer and combined oxidizer/burner unit and the resultant short gas flow pathways allow high dynamics for the system, thereby allowing rapid reaction to load fluctuations. Because of the low total weight of this reactor module and the fact that its elements can be heated, it can be warmed up rapidly during a cold start and therefore is able after only a short time to perform reformation under full load. Since the system can be made compact, its surface is also comparatively small, which in turn keeps heat losses low.

According to a method for operating this system, a gas containing oxygen with an oxygen component is added to the combined oxidizer/burner unit. The oxygen component is larger than the amount required solely for selective CO oxidation. This increased oxygen supply therefore has the result that not only is the carbon monoxide contained in the reformate gas sufficiently oxidized (the oxidation being already initiated when a certain amount of heat is generated) by the combined oxidizer/burner unit, but also a suitable fuel material is burned catalytically without a flame with the rest of the oxygen. In this connection, it is primarily the hydrogen contained in the reformate gas and any unreacted hydrocarbon present in the reformer that serves as the fuel. The addition of oxygen to the combined oxidizer/burner unit is controlled or regulated such that all of the heat that is produced by CO oxidation and catalytic combustion is just sufficient to keep the reformer at its operating temperature.

In a system according to another embodiment of the present invention, the reformer and the combined oxidizer/burner unit are integrated as a module having a heat transmitting structure into a reactor module of the plate stack and/or tube bundle type. In addition, an evaporator connected upstream of the reformer and a catalytic burner that is in thermal contact with the reformer are integrated into the reactor module as an additional module having a heat transfer structure. This produces a highly integrated reformation system with an evaporator, reformer, and CO oxidizer, as well as heating of the evaporator and reformer by catalytic combustion processes in combustion chambers that are in thermal contact with the latter. In another embodiment of this system, the two modules are separated from one another by thermally insulating elements and hence are decoupled thermally from one another.

In another embodiment of the present invention, at least one additional CO removal stage without a burner function is connected downstream from the combined oxidizer/burner unit, so that as a result of this additional CO removal stage, the CO concentration in the reformate gas can be reduced if necessary.

Other objects, advantages and novel features of the present invention will become apparent from the following detailed description of the invention when considered in conjunction with the accompanying drawings.

DETAILED DESCRIPTION OF THE DRAWINGS

Figure 1:
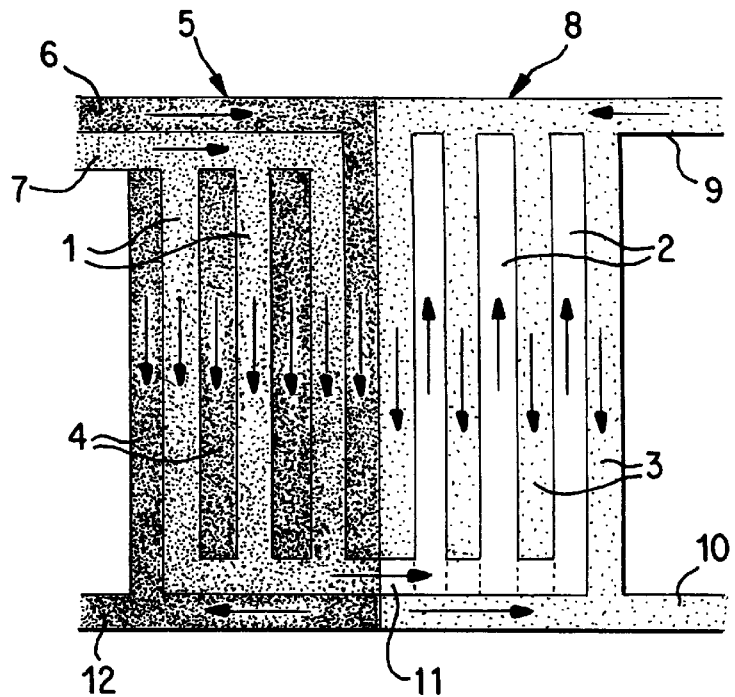
FIG. 1 shows a schematic lengthwise section through a reactor module of the plate stack type for hydrogen reformation of a hydrocarbon.

The reactor module of the plate stack type shown schematically in FIG. 1 is suitable as the central part of a system for hydrogen reformation of a hydrocarbon, especially for hydrogen reformation of liquid methanol for a fuel-cell operated motor vehicle. An evaporator 1, a reformer 2 connected downstream thereof, a combined oxidizer/burner unit 3 connected downstream of the reformer, and a catalytic burner 4 are integrated into the reactor module.

Under these conditions, catalytic burner 4 is in thermal contact with evaporator 1. These two system components are formed by a suitable evaporator/burner module 5 that has a plate stack design with a heat-transfer structure. In this structure, several parallel layers of evaporator 1 and of burner 4 are arranged in an alternating sequence and are in thermal contact through heat-conducting plate walls. The evaporator/burner module 5 has a burner inlet 6 with a corresponding distribution duct to the parallel burner layers and an evaporator inlet 7 with a corresponding distributor duct for supplying methanol and water to the parallel evaporator layers. In addition, a burner outlet 12 with a corresponding collecting duct leads from the output side of burner 4.

Evaporator/burner module 5 is adjoined by an additional module 8 which in turn has a plate stack structure with heat transfer structure, in which two groups of second plate layers parallel to one another are in thermal contact via heat-conducting plate walls. One group of second plate layers forms reformer 2, while the other group of plate layers forms combined oxidizer/burner unit 3. Accordingly, this module 8 has an air inlet 9 with a matching distribution duct for the combined oxidizer/burner unit 3 and a reformate gas outlet 10 leading away from the combined oxidizer/burner unit 3 with a matching collecting duct. In addition, a connecting duct 11 with a collecting duct on the evaporator side and a distribution duct on the reformer side leads from the outlet side of evaporator 1 to the inlet side of reformer 2.

In the reactor module shown in FIG. 1, the two modules 5 and 8 adjoin one another directly. Alternatively, if necessary, a thermally insulating separating plate can be provided between the two modules 5, 8 in order to decouple the two modules 5, 8 thermally.

During the operation of the system, catalytic combustion of a supplied mixture of a fuel, methanol for example, and/or hydrogen, and a gas containing oxygen, air for example, takes place in burner 4 on the evaporator side. Provision can be made particularly in this case to burn the offgases from a fuel cell to which the generated reformate gas is supplied on the anode side. The evaporator 1 that is in thermal contact with burner 4 is heated to its required operating temperature by the heat thus generated. A methanol/water mixture supplied to evaporator 1 is evaporated, and preferably superheated. This methanol/steam mixture enters reformer 2 where the methanol is reformed and as a result a hydrogen-rich reformate gas with a certain CO component is formed. This reformate gas passes from the outlet side of reformer 2 into the distribution duct of the combined oxidizer/burner unit 3 on the inlet side, in which unit the associated air inlet 9 terminates, with this distributor duct thus simultaneously functioning as a collecting duct on the outlet side of the reformer. From here the reformate gas together with an adjustable volume of the gas containing oxygen which is added through air inlet 9, such as air, passes into the parallel plate layers of the combined oxidizer/burner unit 3. Here the carbon monoxide contained in the reformate gas is oxidized as much as possible so that the CO concentration in the reformate gas stream that is carried away through reformate gas outlet 10 is below a desired limit, below 50 ppm for example.

Characteristically, during operation of the system, an oxygen component is fed to the combined oxidizer/burner unit through air inlet 9. The oxygen component is larger than the oxygen component required for this selective CO oxidation alone. The remaining amount of oxygen oxidizes a certain small amount of the hydrogen of which the reformate gas that is formed essentially consists, as well as any unreacted methanol still contained in the reformate gas. This catalytic combustion process takes place in combined oxidizer/burner unit 3 in addition to and simultaneously with CO oxidation. As a result of the catalytic combustion process, sufficient heat is generated in the combined oxidizer/burner unit 3 in order to keep reformer 2, which is in thermal contact with this unit 3, at its elevated operating temperature suitable for performing the hydrogen reformation reaction, for which purpose the heat released during CO oxidation alone is insufficient. The supply of oxygen to combined oxidizer/burner unit 3 is controlled or regulated such that the heat generated in this unit 3 by the CO oxidation and the catalytic combustion process exactly covers the heat requirement keeping reformer 2 at its optimum operating temperature for complete methanol reaction and to compensate the heat losses. As a result, the quantity of oxygen supplied, for example in the form of a suitably metered volume of air, is regulated as a function of the amount of methanol and water supplied to reformer 2. With a higher methanol and water input to reformer 2, i.e. a greater reaction in the reformer and hence a higher system load, the amount of oxygen to be added to the combined oxidizer/burner unit increases.

Clearly, the reactor module in FIG. 1 has an extremely compact design with simultaneous integration of all the components required for hydrogen reformation of methanol or another hydrocarbon to prepare a reformate gas consisting essentially of hydrogen with a low CO concentration, i.e. with evaporator 1, reformer 2, and a CO removal unit in the form of combined oxidizer/burner unit 3. Each of the two modules 5 and 8 can be built up from a number of plate layers to be determined for each application, so that by simple modification, optimum adaptation to individual applications is possible and different performance classes for each of the system components integrated into the reactor module can be achieved. In addition to the modules 5, 8 of the plate stack type that are shown, functionally equivalent modules of the tube bundle type can be used as an alternative to one or both modules 5, 8.

In the design of modules 5 and 8 shown, in the plate stack of each module a plate layer of one system component alternates with a plate layer of the other system component so that the ratio of the numbers of plate layers for the two components is essentially 1:1. Alternatively, modules modified as required can be used with any other ratio of the plate layer numbers of the two respective system components.

Another modification of the reactor module shown consists in following the combined oxidizer/burner unit 3 by one or more cooled or adiabatically operated CO oxidizer stages.

In another modification of the reactor module shown, provision is made for metering gas containing oxygen, such as air, into reformer 2 itself, in order to produce additional heat therein for performing the reformation reaction by burning methanol and/or hydrogen.

The compact design of the reactor module in FIG. 1 takes up only a small amount of space and has low heat losses because of its small surface. This results in a high degree of efficiency of the system which is also favored by the fact that the heat losses from the combined oxidizer/burner unit 3 are used to heat reformer 2. As a result of the small volume and short gas flow pathways, the reactor module and hence the system as a whole exhibit comparatively high dynamics and rapid warm-up behavior during cold starts, which is desirable for mobile applications in fuel-cell operated motor vehicles because of the rapid load changes typical in this application, since the total mass of the reactor module is relatively low and all system components may be heated. The modular design permits simply upscaling to any desired performance of the system.

Figure 2:
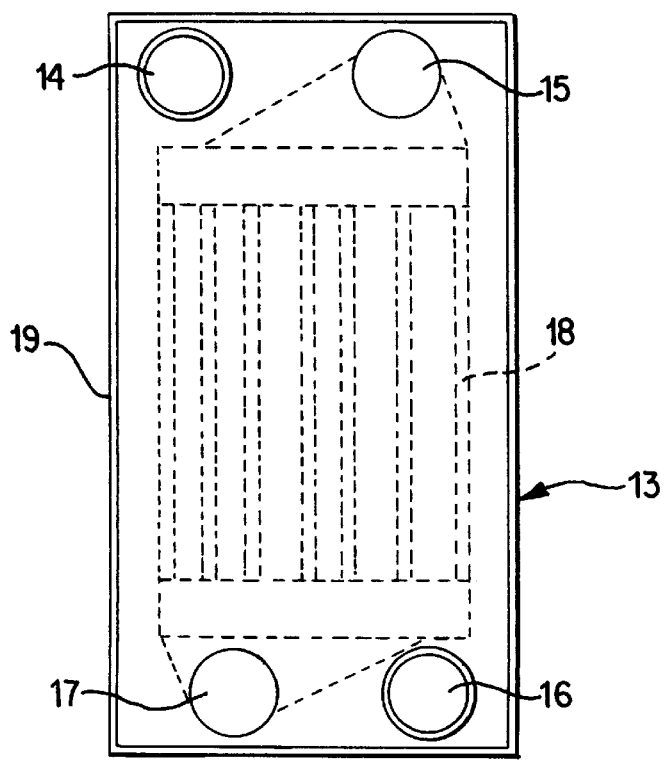
FIG. 2 is a top view of an individual plate for the reactor module in FIG. 1.

FIG. 2 shows a top view of a heat-transfer plate 13 like those that can be used in the reactor module in FIG. 1 for evaporator/burner module 5 and in an essentially similar form for the other module 8. On the opposite narrow sides of the plate, two openings 14, 15, 16, 17 are provided, with the openings in the same positions in plates located successively in the stack overlapping in a flush manner to form matching inlet or outlet ducts and/or distribution or collecting ducts. In plate 13 in FIG. 2, one pair of openings 15, 17 that are diagonally opposite one another form a part of a corresponding collecting and/or distribution duct, for example of evaporator 1, and function as a fluid inlet and/or fluid outlet. In this way the fluid passes through the inlet into the plane of plate 13 and flows there along a supporting and distributing structure 18 provided on plate 13 to the opposite outlet, with the medium that flows along the other side of the plate, coming in contact thermally for example with the hot combustion offgas from burner 4. The other two openings 14, 16, shown surrounded by a heavy line in FIG. 2, and plate edge 19 form gas-tight connections through which the other medium in each case in the plate stack can pass through the plate layer in question. These openings 14, 16 can be part of burner inlet 6 and/or burner outlet 12 for example.

Figure 3:
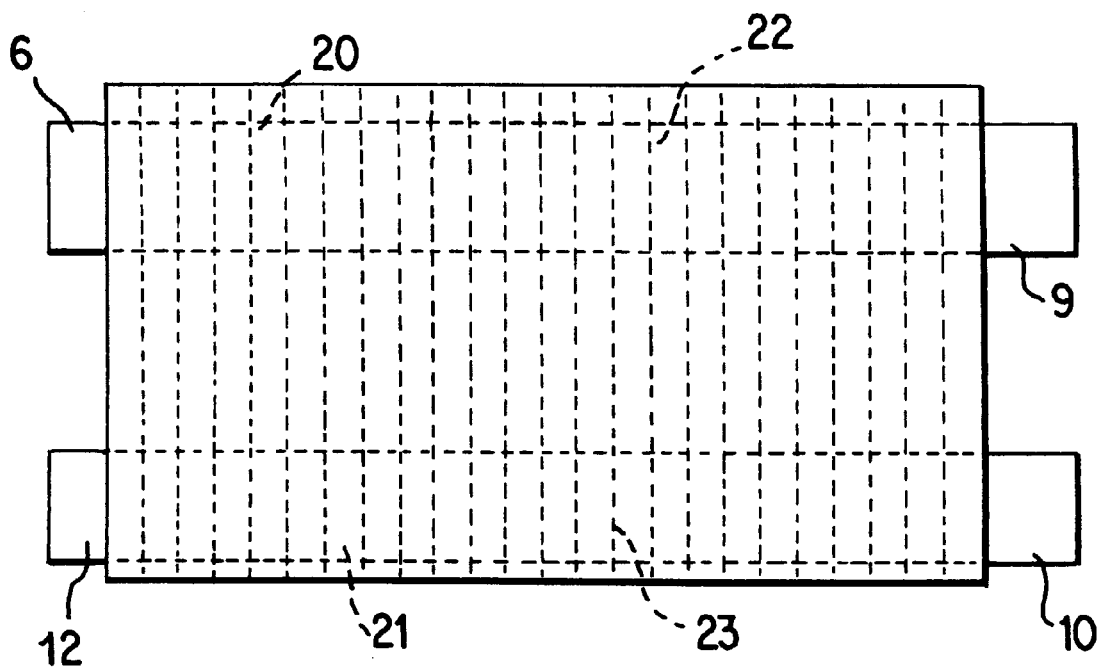
FIG. 3 is a top view of the reactor module in FIG. 1.

In a top view, FIG. 3 shows the compact reactor module of FIG. 1 with its plate stack design, with burner inlet 6 and burner outlet 12 being visible in this view at one end of a stack, as well as air inlet 9 and reformate gas outlet 10 at the other end of the stack. The evaporator inlet 7 in this view is covered by burner inlet 6. In addition, the extent of the respective inlet or outlet ducts 20, 21, 22, 23 (i.e., the distributing or collecting ducts that belong to the inlets or outlets 6, 9, 10, 12) are indicated by the dashed lines in the plate stack structure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for steam reformation of a hydrocarbon, comprising:
    a reformer;
    a combined oxidizer/burner unit connected downstream from the reformer and in thermal contact therewith,
    wherein said oxidizer/burner unit is both a CO oxidizer and simultaneously a catalytic burner during operation of the reformer.

2. The system according to claim 1, wherein said reformer and said combined oxidizer/burner unit are integrated as a first module having a heat-transfer structure into a reactor module.

3. The system according to claim 2, wherein said reactor module is at least one of a plate stack reactor and tube bundle reactor.

4. The system according to claim 2, further comprising:
    an evaporator connected upstream of said reformer; and
    a catalytic burner in thermal contact therewith,
    wherein said evaporator and said catalytic burner are integrated as a second module having a heat-transfer structure into said reactor module.

5. The system according to claim 4, wherein said first and second modules are separated from one another in said reactor module by thermally insulating elements.

6. The system according to claim 1, further comprising at least one CO removal unit downstream of said oxidizer/burner unit.

7. A method for steam reformation of a hydrocarbon, comprising:

combusting a mixture of a fuel and a gas containing oxygen in a catalytic burner, thereby heating an evaporator in thermal contact with the catalytic burner;

evaporating a mixture of water and methanol in the evaporator to form a methanol and steam mixture;

directing the methanol and steam mixture to a reformer, thereby producing a reformate gas containing hydrogen and carbon monoxide;

passing an oxygen-containing gas and the reformate gas through a combined oxidizer/burner unit; and oxidizing the carbon monoxide in the reformate gas.

8. The method according to claim 7, wherein a oxygen component concentration of the oxygen-containing gas is greater than the required concentration for CO oxidation.

9. The method according to claim 7, wherein the concentration of carbon monoxide in the reformate gas after said oxidizing is less than 500 ppm.

10. A method according to claim 7, further comprising:

catalytically burning at least one of unreacted methanol and a predetermined amount of hydrogen in the reformate gas in the oxidizer/burner unit; and transmitting heat to the reformer, thereby maintaining the reformer at an operating temperature.

* * * * *